(12) United States Patent
Antony et al.

(10) Patent No.: US 9,927,787 B2
(45) Date of Patent: Mar. 27, 2018

(54) METHOD AND SYSTEM FOR MANAGING DISTRIBUTED COMPUTING IN AUTOMATION SYSTEMS

(71) Applicant: Siemens Aktiengesellschaft, Munich (DE)

(72) Inventors: Elvis Antony, Bangalore (IN); Grace Leelavathy, Hosur (IN)

(73) Assignee: Siemens Aktiengesellschaft, Munich (DE)

( * ) Notice: Subject to any disclaimer, the term of this patent is extended or adjusted under 35 U.S.C. 154(b) by 835 days.

(21) Appl. No.: 14/219,367

(22) Filed: Mar. 19, 2014

(65) Prior Publication Data
US 2014/0288673 A1    Sep. 25, 2014

(30) Foreign Application Priority Data

Mar. 20, 2013   (EP) .................................... 13160206

(51) Int. Cl.
*G05B 19/00*    (2006.01)
*G06F 9/46*    (2006.01)
(Continued)

(52) U.S. Cl.
CPC ......... *G05B 19/0421* (2013.01); *G06F 8/456* (2013.01); *G05B 2219/2205* (2013.01);
(Continued)

(58) Field of Classification Search
None
See application file for complete search history.

(56) References Cited

U.S. PATENT DOCUMENTS 5,564,049 A    10/1996   Schmidt
5,968,163 A *  10/1999   Narayan ................... G06F 9/28
                                                        712/204
(Continued)

FOREIGN PATENT DOCUMENTS

CN    102227710    10/2011
CN    102667648    9/2012
(Continued)

OTHER PUBLICATIONS

Office Action dated Sep. 26, 2016 which issued in the corresponding Chinese Patent Application No. 201410100294.5.

*Primary Examiner* — Lewis A Bullock, Jr.
*Assistant Examiner* — Melissa Headly
(74) *Attorney, Agent, or Firm* — Cozen O'Connor (57) ABSTRACT

Method and a system for managing distributing computing suitable for implementation in an automation system are provided, wherein in a first step, a set of program instructions is partitioned into a plurality of unit blocks, where each unit block comprises at least one program instruction and, in a second set, at least one complementary block corresponding to at least one unit block are identified from the remainder of the plurality of unit blocks, where the complementary blocks are identified based on a comparison between read-write access of global variables in the unit block and corresponding complementary blocks and, in another step, the plurality of unit blocks are executed on a set of multiple processors within the automation system such that at least one complementary block is executed in parallel with a corresponding unit block.

10 Claims, 9 Drawing Sheets

```
                                                    700
IF (Read identifier set of Block N ∩ Write identifier set of Block N-1 = 0)
{
    IF (Read identifier set of Block N ∩ Write identifier set of Block N-2 = 0)
    {
        IF (Read identifier set of Block N ∩ Write identifier set of Block N-3 = 0)
        {
          ... Continues till Block 1
          {
          ELSE
          {
                    Block N can be executed in parallel with N-2
          }
    }
    ELSE
    {
            Block N can be executed in parallel with N-1
    }
ELSE
{
    Block N cannot be executed in parallel with any of the blocks prior to it.
}
```

(51) Int. Cl.
*G05B 19/042* (2006.01)
*G06F 9/45* (2006.01)
(52) U.S. Cl.
CPC ............. *G05B 2219/2216* (2013.01); *G05B 2219/25229* (2013.01)

(56) References Cited

U.S. PATENT DOCUMENTS

| | | | | |
|---|---|---|---|---|
| 2009/0172353 | A1* | 7/2009 | Su | G06F 8/456 712/30 |
| 2012/0260239 | A1 | 10/2012 | Martinez Canedo et al. | |
| 2013/0211545 | A1* | 8/2013 | Jie | G05B 19/0421 700/4 |

FOREIGN PATENT DOCUMENTS

| | | |
|---|---|---|
| CN | 102929214 | 2/2013 |
| WO | WO 2009/0851182 | 7/2009 |

* cited by examiner

```
FUNCTION_BLOCK FB101                                                    ⎫
VAR_INPUT                                                               ⎬ 302
                                                                        ⎭
  I_RESISTANCE: REAL;                                                   ⎫
  I_INDUCTANCE: REAL;                                                   ⎬ 304
  I_CAPACITANCE: REAL;                                                  ⎭
END_VAR
VAR_TEMP                                                                ⎫
  T_Conductance:REAL;                                                   ⎪
  T_Reactance_C: REAL;                                                  ⎪
  T_Reactance_L: REAL;                                                  ⎪
  T_Impedance: REAL;                                                    ⎬ 306
  T_ResonantFrequency: REAL;                                            ⎪
  T_FigureOfMerit_Q_C: REAL;                                            ⎪
  T_FifureOfMerit_Q_L: REAL;                                            ⎭
END_VAR
BEGIN                                                                   ⎫
  T_Conductance:= 1 / I_RESISTANCE;                                     ⎪
  T_ResonantFrequency:= 1 / (2 * 3.14 * SQRT(I_INDUCTANCE * I_CAPACITANCE));  ⎪
  T_Reactance_C:= 1 / (2 * 3.14 * T_ResonantFrequency * I_CAPACITANCE); ⎪
  T_Reactance_C:= 2 * 2.14 * T_ResonantFrequency * I_INDUCATANE;        ⎬ 308
  T_Impedance:= SQRT((I_RESISTANCE**2) + ((T_Reactance_L - T_Reactance_C)**2));  ⎪
  T_FigureOfMerit_Q_C:= T_Reactance_C / I_RESISTANCE;                   ⎪
  T_FigureOfMerit_Q_L:= T_Reactance_L / I_RESISTANCE;                   ⎭
END_FUNCTION_BLOCK                                                      } 310
```

| UNIT BLOCK IDENTITY | SET OF PROGRAM INSTRUCTIONS |
|---|---|
| 1 | T_Conductance:= 1 / I_RESISTANCE; |
| 2 | T_ResonantFrequency:= 1 / (2 * 3.14 * SQRT(I_INDUCTANCE * I_CAPACITANCE)); |
| 3 | T_Reactance_C:= 1 / (2 * 3.14 * T_ResonantFrequency * I_CAPACITANCE); |
| 4 | T_Reactance_C:= 2 * 2.14 * T_ResonantFrequency * I_INDUCATANE; |
| 5 | T_Impedance:= SQRT((I_RESISTANCE2) + ((T_Reactance_L - T_Reactance_C)2)); |
| 6 | T_FigureOfMerit_Q_C:= T_Reactance_C / I_RESISTANCE; |
| 7 | T_FigureOfMerit_Q_L:= T_Reactance_L / I_RESISTANCE; |

| UNIT BLOCK INDENTITY | READ-ACCESS VARIABLES | WRITE-ACCESS VARIABLES |
|---|---|---|
| 1 | X1 | X4 |
| 2 | X2, X3 | X8 |
| 3 | X3, X8 | X5 |
| 4 | X2, X8 | X6 |
| 5 | X1, X5, X6 | X7 |
| 6 | X1, X5 | X9 |
| 7 | X1, X6 | X10 |

```
IF (Read identifier set of Block N ∩ Write identifier set of Block N-1 = 0)
{
    IF (Read identifier set of Block N ∩ Write identifier set of Block N-2 = 0)
    {
        IF (Read identifier set of Block N ∩ Write identifier set of Block N-3 = 0)
        {
        ... Continues till Block 1
        {
        ELSE
        {
                Block N can be executed in parallel with N-2
        }
    }
    ELSE
    {
        Block N can be executed in parallel with N-1
    }
ELSE
{
    Block N cannot be executed in parallel with any of the blocks prior to it.
}
```

Block N: Block that is executed currently.
PLC n: PLC to which the container block got downloaded
M: Number of PLCs/Cores

```
FOR (Each child Block in the container block)
{
    IF (Block N+1 can execute in parallel with Block N)
    {
            Label1: i=1;
            X1=Load of current PLC/Core;
            Y=Current PLC;

WHILE (i<M)
            {
                X2=Load of PLC / Core (i);
                IF (X1>X2)
                {
                    X1=Load of PLC / Core (i);
                    Y=PLC (i);
                }
                i=i+1;
            }
            If (Block N-1 is not completely executed)
            {
                Delay (Till Block N-1 executes);
                GOTO Label 1;
            }

Queue Block N+1 in PLC/Core Y;
    }
    ELSE
    {
    Queue Block N_1 in the PLC/Core where Block N is executing;
    }
}
```

METHOD AND SYSTEM FOR MANAGING DISTRIBUTED COMPUTING IN AUTOMATION SYSTEMS

BACKGROUND OF THE INVENTION

1. Field of the Invention

The present invention generally relates to automation systems and, more particularly, to managing distributed computing in an automation system.

2. Description of the Related Art

Industrial automation systems and, in particular, distributed automation systems, have special devices known as programmable logic controllers. In practise, such programmable logic controllers are digital computers used for interfacing with a set of sensors and actuators employed for control of machinery in diverse industrial plants. Unlike general-purpose computers, the programmable logic controllers are designed for multiple inputs and output arrangements, and to also withstand harsh environmental conditions prevalent in industrial plants, such as high temperatures, electrical noise, or vibration and impact. However, the most important constraint on a programmable logic controller is that it should be a hard real-time system because the output results must be produced in response to the input conditions within a limited time, otherwise undesirable operations might be performed.

Owing to the above hard real time constraint, general parallel computing concepts such as multithreading and cloud computing have been proposed to reduce processing time in programmable logic controllers.

International Electrotechnical Commission (IEC) Standard 61131-3 currently defines five programming languages for programmable control systems: Function block diagram (FBD), Ladder diagram (LD), Structured Text (ST), Instruction List (IL), and Sequential Function Chart (SFC). All these programming language emphasize logical organization of operations. As a result, individual operations are grouped together. During runtime, such individual groups are formed as individual threads that may be executed in parallel. However, in the state of the art, such individual groups represent the smallest logical unit that is allowed be independently executed.

SUMMARY OF THE INVENTION

In light of the state of the art, there is a need to provide a system and a method for further enhancing distributed computing capabilities in programmable logic controllers to further reduce response times thereof.

In view of the foregoing, it is an object of the present invention to provide a system and method for managing distributed computing in an automation system such that the response time of individual programmable logic controllers is further reduced.

This and other objects and advantages are achieved in accordance with the invention by a method and a system for distributed computing in which an automation program is partitioned into individual unit blocks and a complementary correspondence between individual unit blocks is identified based on respective read-write accesses to a set of global variables. The individual unit blocks are thereafter schedule on a set of multiple processors based on a computational load on individual processors and the complementary correspondence between the unit blocks.

In accordance with the present invention, a method is provided for managing distributed computing in an automation system. During a first step, a set of program instructions is partitioned into a plurality of unit blocks. Each unit block comprises at least one program instruction. Subsequently, one or more complementary blocks corresponding to at least one unit block are identified from the remainder of the plurality of unit blocks. The complementary blocks are identified based on a comparison between read-write access of global variables in the unit block and corresponding complementary blocks. The plurality of unit blocks are executed on a set of multiple processors within the automation system such that at least one complementary block is executed in parallel with a corresponding unit block.

In accordance with the present invention, a system is provided for managing distributed computing in an automation system. The system includes a partitioning module, an assessment module, and a scheduling module. The partitioning module is configured to partition a set of program instructions into a plurality of unit blocks, where each unit block comprises at least one program instruction. The assessment module is configured to identify one or more complementary blocks corresponding to at least one unit block from the remainder of the plurality of unit blocks, where the complementary blocks are identified based on a comparison between read-write access of global variables in the unit block and corresponding complementary blocks. The scheduling module is configured to execute the plurality of unit blocks on a set of multiple processors within the automation system, where at least one complementary block is executed in parallel with corresponding unit block.

Accordingly, the present invention provides a system and a method for managing distributed computing in an automation system such that response time of individual programmable logic controllers is further reduced.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is further described hereinafter with reference to illustrated embodiments shown in the accompanying drawings, in which.

DETAILED DESCRIPTION OF THE PREFERRED EMBODIMENTS

Various embodiments are described with reference to the drawings, where like reference numerals are used to refer to like elements throughout. In the following description, for purpose of explanation, numerous specific details are set forth in order to provide a thorough understanding of one or more embodiments. It may be evident that such embodiments may be practiced without these specific details.

Figure 1:
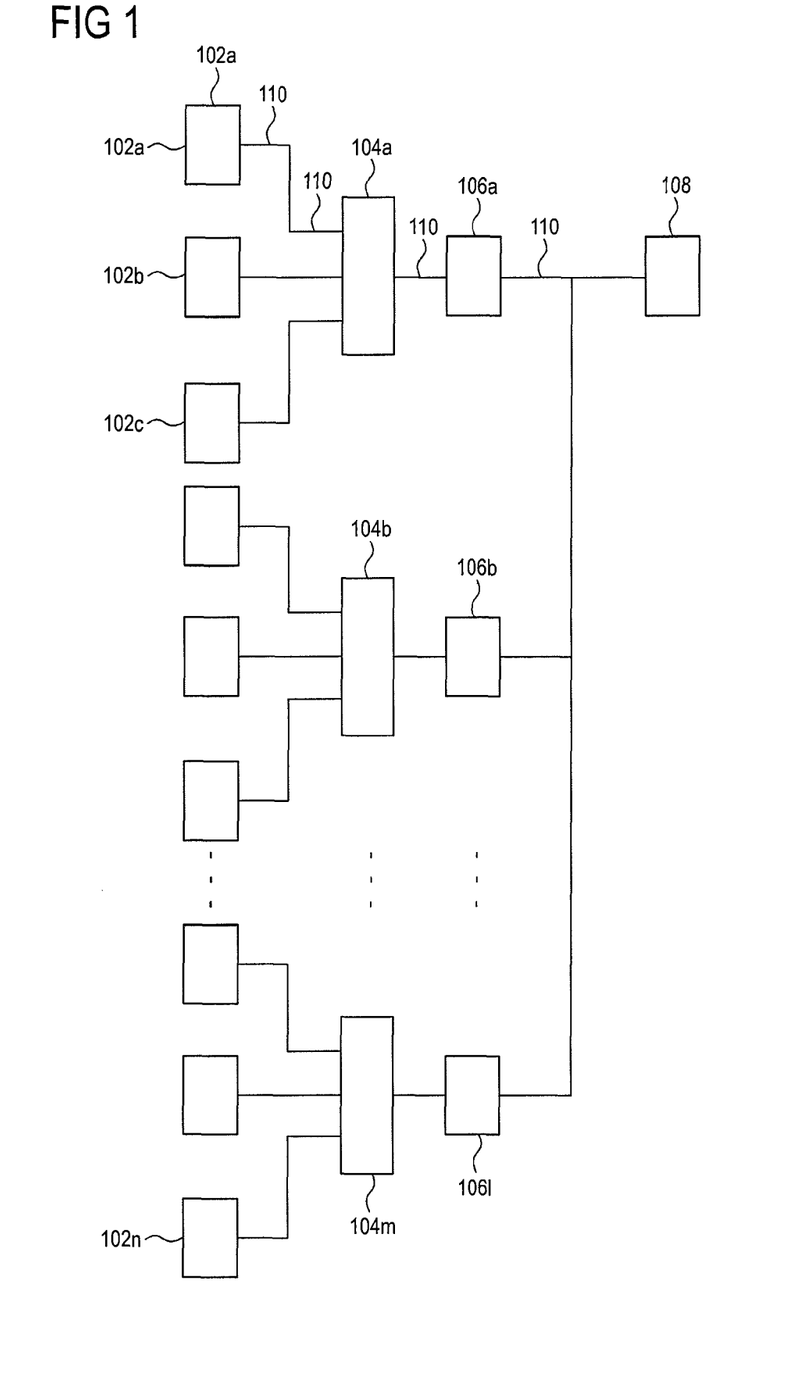
FIG. 1 illustrates a schematic view of an automation system in accordance with an embodiment of the present invention.

Referring to FIG. 1, a schematic view of an automation system 100 is illustrated in accordance with an embodiment of the present invention.

The automation system 100 may be used in any industrial plant for monitoring and controlling a desired process. The automation system 100 includes a set of process devices 102a through 102n, a set of process controllers 104a through 104m, a set of human-machine interface devices 106a through 106l, and an engineering station 108.

Various examples of such industrial processes include, but are not limited to, food industry, automotive industry, and so forth. Accordingly, the process devices 102 may include a wide variety of operational components, such as electric motors, drives, valves, actuators, temperature/pressure sensors and so on.

The process controllers 104 are configured to monitor and control the process devices 102 based on a control logic resident therein. In typical applications, the process controllers 104 are implemented using programmable logic controllers. Each process controller 104 includes a processor (not shown). In various embodiments of the present invention, the processor may be a multi-core processor. The term "multiple processors", as used throughout in the present disclosure, is intended to refer to both the individual processor cores resident within a single process controller 104 as well as multiple processors included in the one or more process controllers 104 within the automation system 100.

The human-machine interface devices 106 provide an interface to a user of the automation system 100. Typically, the human-machine interface devices 106 include program code for displaying a set of graphical user interfaces to the user of the automation system 100. The human-machine interface devices 106 are configured to read/write data from/to memory (e.g., internal registers) of process controllers 104. In some embodiments, the human-machine interface devices 106 may simply perform the function of accessing and displaying data to the user of the automation system 100.

The engineering station 108 provides a development environment in which a set of control programs are developed. The control programs are then transferred to the relevant process controllers 104, and are executed therein.

All the components 102 through 108 discussed above are communicatively coupled to each other through a communication network 110. The interconnections between selective components as depicted in the adjoining figure are only exemplary. In general, direct communication between any two components is possible over the communication network 110 using suitable communication protocols as generally well known in the art.

In accordance with various exemplary embodiments of the present invention, a distributed computing management system is thus provided in the automation system 100.

Figure 2:
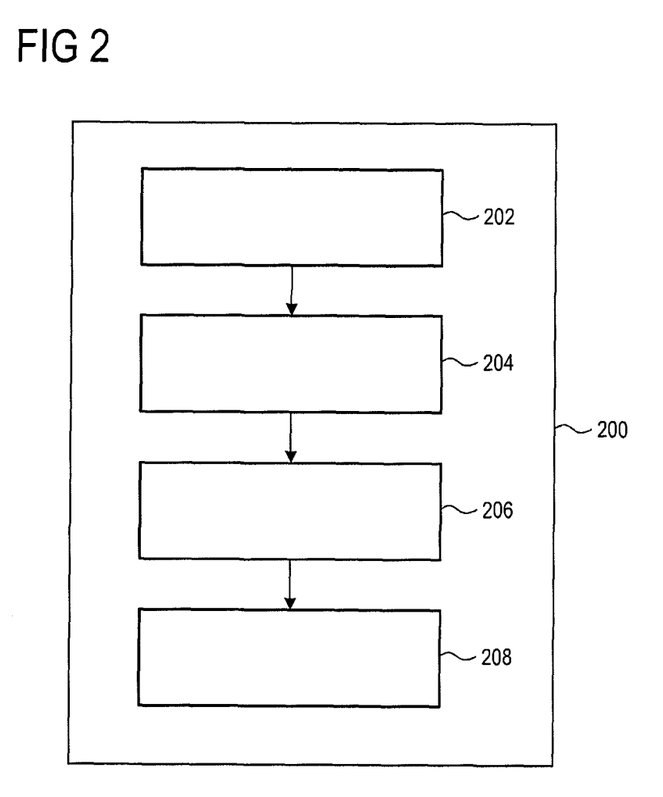
FIG. 2 illustrates a schematic view of a system for managing distributed computing within an automation system in accordance with an embodiment of the present invention.

FIG. 2 illustrates a schematic view of a system 200 for managing distributed computing in the automation system 100 in accordance with an embodiment of the present invention.

The system 200 includes a partitioning module 202, an assessment module 204, a code-conversion module 206, and a scheduling module 208. It should be noted that the individual modules 202 through 208 may be resident on different components within the automation system 100. In one example, the partitioning module 202, the assessment module 204, and the code-conversion module 206 are resident on the engineering stations 108, while individual scheduling modules 206 are resident on individual process controllers 104. However, in various embodiments of the present invention, the modules 202 through 206 may be located in any combination and any multiplicity on any component within the automation system 100.

The partitioning module 202 is configured to partition a set of program instructions into multiple unit blocks. Each unit block includes at least one program instruction.

In an exemplary embodiment of the present invention, the set of program instructions is partitioned based on non-sequential processing instructions. As is generally well known in the art, within a single control program, selected instructions in the set of program instructions are provided with individual "labels" which represent non-sequential begin pointers. Similarly, the set of program instructions may include individual "jump" program instructions, which represent non-sequential end pointers. In this embodiment, each non-sequential beginning pointer initiates a partition and a non-sequential end pointer terminates the partition. Thus, a sub-set of program instructions between the non-sequential begin pointer and the non-sequential end pointer are grouped in an individual unit block.

In an alternative exemplary embodiment of the present invention, the set of program instructions is partitioned such that each statement forms an individual unit block.

In various other exemplary embodiments, the two techniques described in conjunction with the two preceding exemplary embodiments are used in combination. Thus, the set of program instructions are parsed and each sub-set of program instructions between a "label" program instruction and a "jump" program instruction are partitioned as a unit block. In addition, each individual program instruction, which is not inside such pair of label and jump program instructions, is identified as an individual unit block.

The assessment module 204 is configured to identify one or more complementary blocks corresponding to at least one unit block from the remainder of the plurality of unit blocks. Each complementary block is identified based on a comparison between read-write access of global variables in the unit block and corresponding complementary blocks.

In various embodiments of the present invention, each complementary block corresponding to an individual unit block is such that none of the global variables read-accessed in the unit block is write-accessed in the complementary block.

The code-conversion module 206 is configured to convert each unit block into binary format and associating the unit block with a container block such that the plurality of unit blocks forms a single logical entity.

During conversion to binary, the variables are converted to offset locations in a globally shared memory that is used by the multiple cores within a single process controller 104. In cases in which the container block is expected to be executed on several process controllers 104, the globally shared memory in which the variables are stored as offset locations, is preferably an external memory accessible by each process controller 104.

The scheduling module 208 is configured to execute the unit blocks on a set of multiple processors resident on individual process controllers 104 or a combination thereof within the automation system 100 such that at least one complementary block is executed in parallel with a corresponding unit block.

In an exemplary embodiment of the present invention, each successive unit block is queued for processing on one of a set of multiple processors based on the computational load on individual processors and complementary correspondence with one or more unit blocks under execution of the set of multiple processors.

As pointed out earlier in the present description, the term multiple processors, in the context of the scheduling module 208, is intended to refer to individual cores in a single processor within an individual process controller 104 as well as multiple processors distributed through the multiple process controllers 104 within the automation system 100.

In an exemplary embodiment of the present invention, each process controller 104 is provided with an individual scheduling module 208. The scheduling module 208 is configured to track computational load on each of the process controllers 104 within the automation system 100. The scheduling module 208 schedules the set of unit blocks within the container block on multiple process controllers 104. In this embodiment, the computational load on each process controller 104 within the automation system 100 is efficiently optimized.

In an exemplary embodiment of the present invention, an external memory (not shown) shared across different process controllers 104 is provided. The multiple unit blocks within the container block utilize this external memory for temporary usage such that input and output data is efficiently shared across multiple process controllers 104.

In various alternative embodiments of the present invention, any suitable techniques for exchanging data across multiple process controllers 104 may be implemented. For example, communication block pairs such as USEND/URCV, BSEND/BRCV and the like may be used to implement the desired data exchange.

Figure 3:
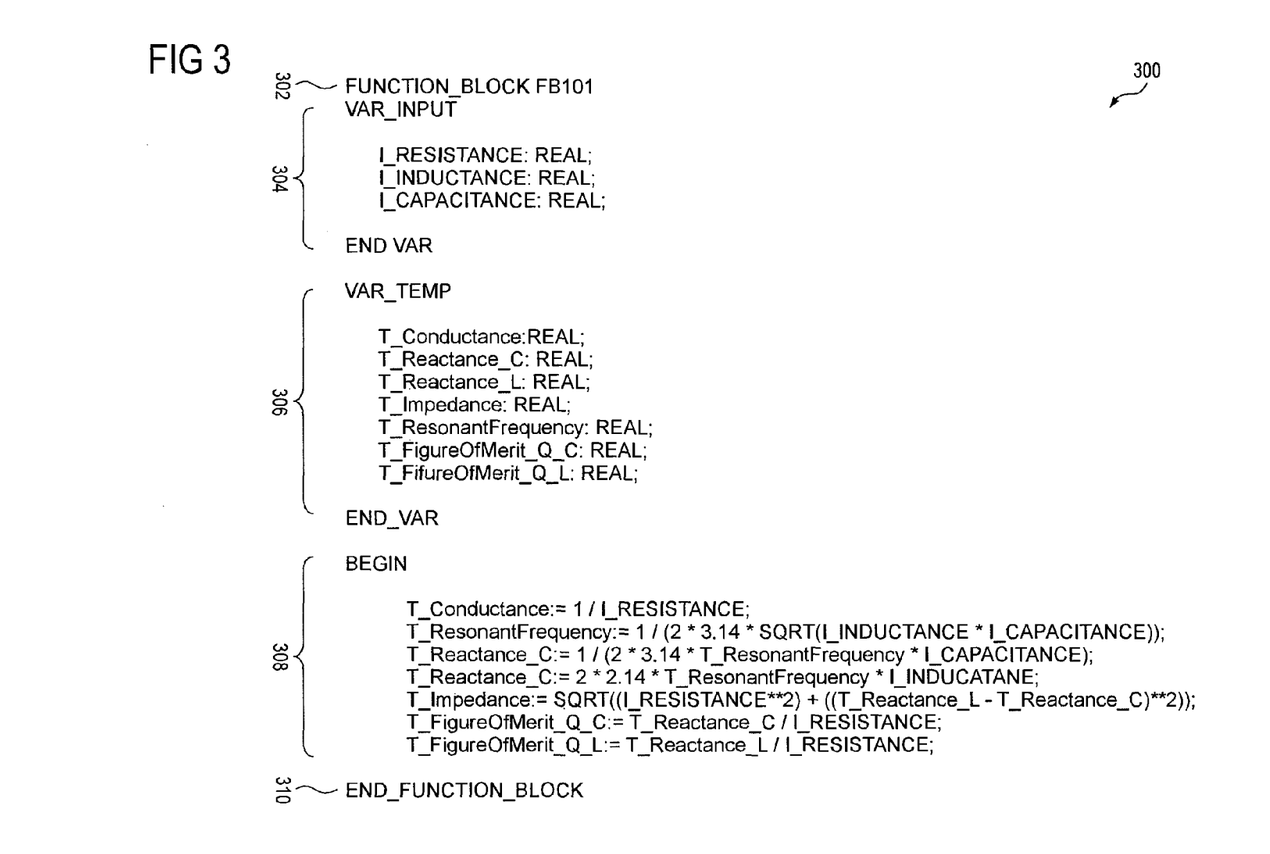
FIG. 3 illustrates a control program in accordance with an embodiment of the present invention.

Referring to FIG. 3, a control program 300 is shown. The control program begins at program statement 302. The program statement 302 is followed by variable declaration blocks 304 and 306. The variable declaration blocks 304, 306 declare several variables such as "I_RESISTANCE", "I_INDUCTANCE", and so on. Finally, the program instructions block 308 is provided. The control program 300 ends at program statement 310.

Figure 4:
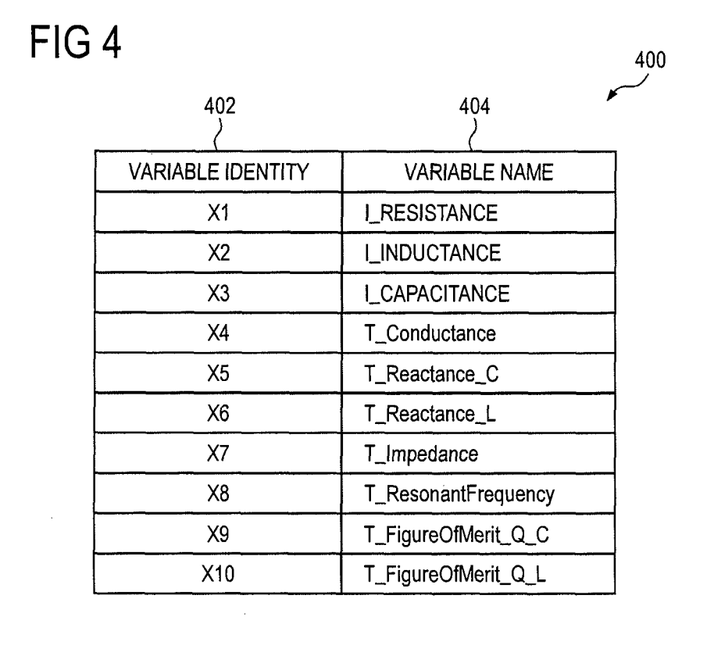
FIG. 4 illustrates a variable information table in accordance with an embodiment of the present invention.

Referring now to FIG. 4, a variable information table 400 is shown. The partitioning module 202 parses the control program 300 to determine the declared variables in the variable declarations blocks 304, 306. The list of variables is stored in a temporary memory location in a tabular format as shown in FIG. 4. The table 400 includes information related to variables under columns labelled "Variable Identity" 402 and "Variable Name" 404.

Figure 5:
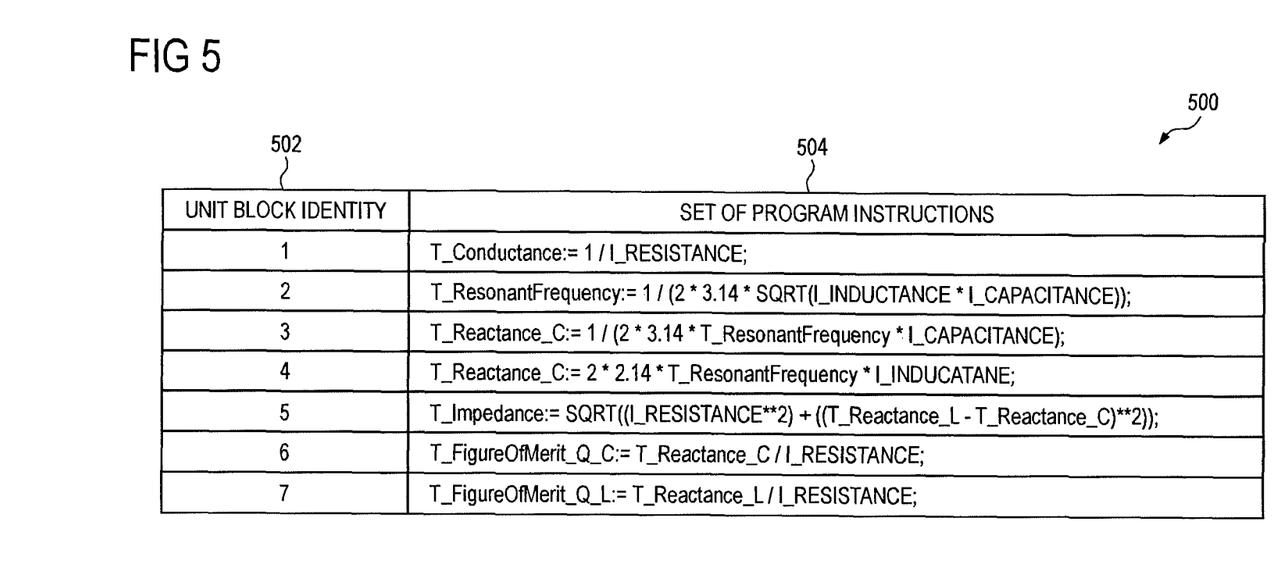
FIG. 5 illustrates a unit block information table in accordance with an embodiment of the present invention.

Referring now to FIG. 5, a unit block information table 500 is shown. The partitioning module 202 generates individual unit blocks. In the particular example shown in the adjoining figures, "label" and "jump" non-sequential processing instructions are not included. Hence, each individual program instruction is identified as a unit block. The individual unit blocks with "Block Identity" and a corresponding set of instructions is determined. The table 500 includes information related to unit blocks and a corresponding set of program instructions under columns labelled "Unit Block Identity" 502 and "Set of Program Instructions" 504.

Figure 6:
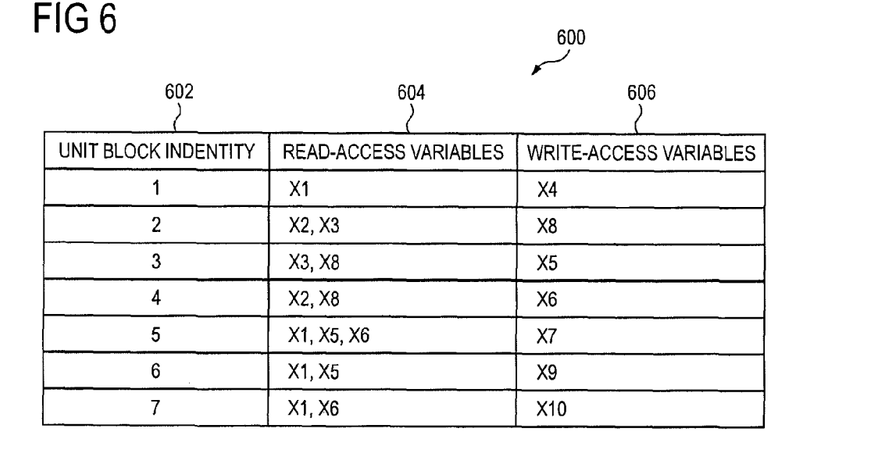
FIG. 6 illustrates a variable access information table in accordance with an embodiment of the present invention.

Referring now to FIG. 6, a variable access information table 600 is shown. The assessment module 204 processes the unit blocks generated using the partitioning module 202. The assessment module 204 identifies a set of read-access variables and a set of write-access variables associated with each unit block. The table 600 includes information related to access to variables in each unit block under columns labelled "Unit Block Identity" 602, "Read-Access Variable" 604, and "Write-Access Variable" 606.

Figure 7:
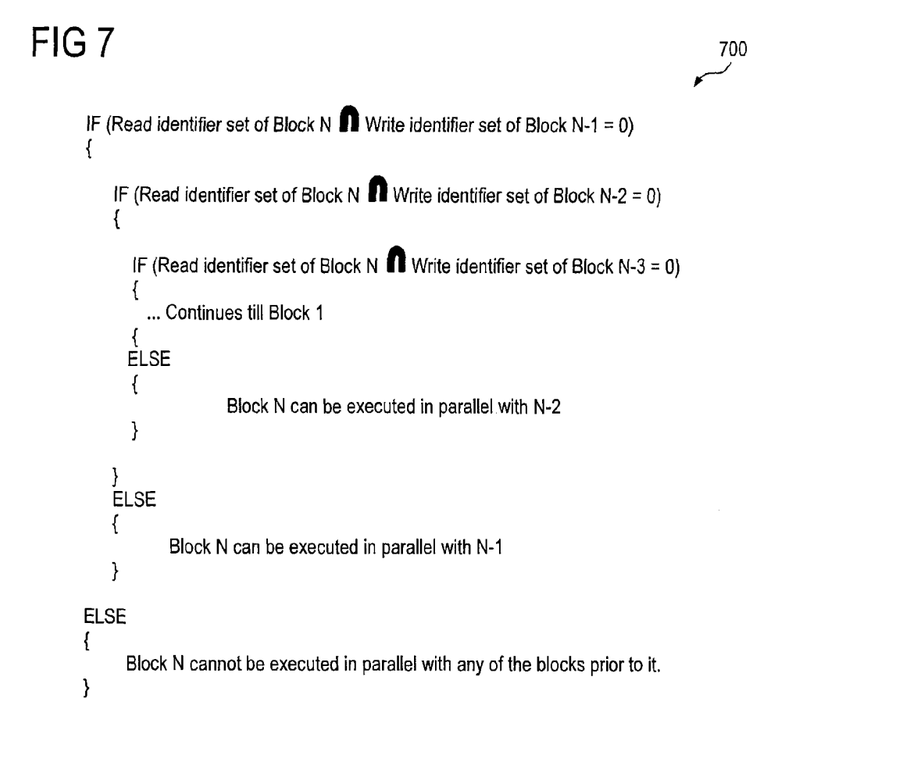
FIG. 7 illustrates a pseudo-code corresponding to an exemplary algorithm for identifying a set of complementary blocks for individual unit blocks in accordance with an embodiment of the present invention.

Referring now to FIG. 7, pseudo-code 700 corresponding to an exemplary algorithm for identifying a set of complementary blocks for individual unit blocks is shown. The assessment module 204 identifies the set of complementary blocks, which have a complementary correspondence for a given unit block, based on a comparison between read-write access of global variables in the unit block and corresponding complementary blocks. As mentioned earlier, in various embodiments of the present invention, each complementary block corresponding to an individual unit block is such that none of the global variables read-accessed in the unit block is write-accessed in the complementary block.

Figure 8:
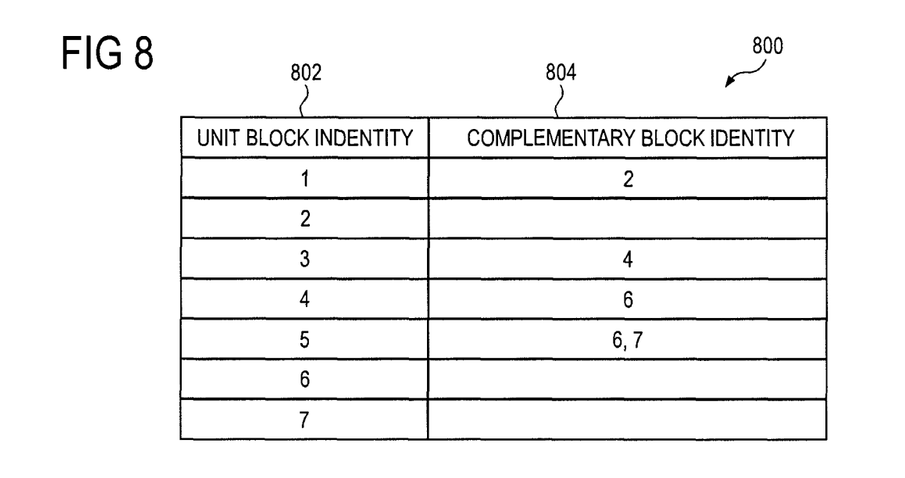
FIG. 8 illustrates a complementary correspondence information table in accordance with an embodiment of the present invention.

Referring now to FIG. 8, a complementary correspondence information table 800 is shown. As evident from the foregoing, in accordance with read-write access of global variables, the complementary blocks corresponding to an individual unit block may be executed in parallel with the given unit block. The table 800 provides such a list of complementary blocks for individual unit blocks. In particular, the table 800 includes information related to complementary correspondence under columns labelled "Unit Block Identity" 802 and "Complementary Block Identity" 804. Thus, for example, unit blocks 6 and 7 are complementary blocks for unit block 5.

Figure 9:
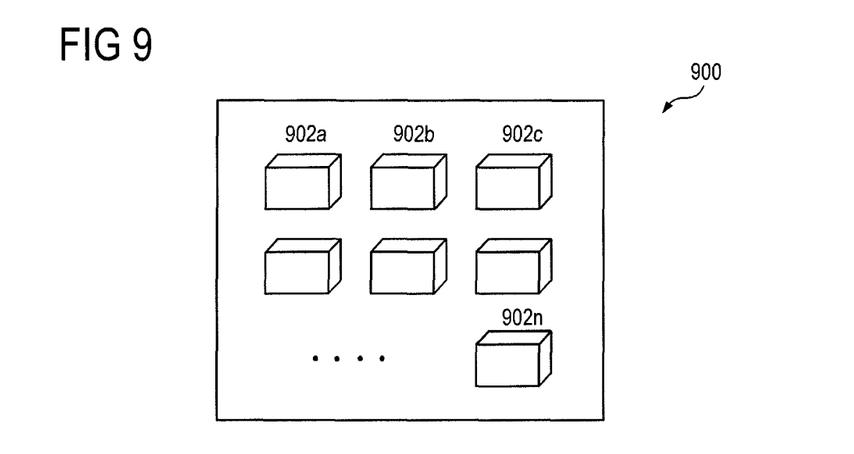
FIG. 9 illustrates a container block in accordance with an embodiment of the present invention.

Referring to FIG. 9, a container block 900 is shown. The container block 900 includes individual unit blocks in binary format 902a, 902b, and so on. The container block 900 forms a single logical entity and can be transferred from one component to another as such.

Figure 10:
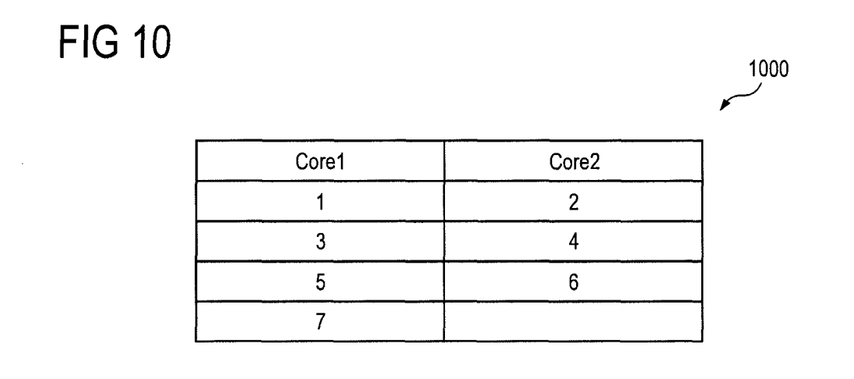
FIG. 10 illustrates schematic scheduling of different unit blocks on a dual core processor in accordance with an embodiment of the present invention.

Referring to FIG. 10, a simple schematic scheduling of different unit blocks on a dual core processor is shown, as per the current example. It should be noted that in this example, the scheduling module 208 schedules the different unit blocks on individual cores only based on the complementary correspondence between different unit blocks.

Figure 11:
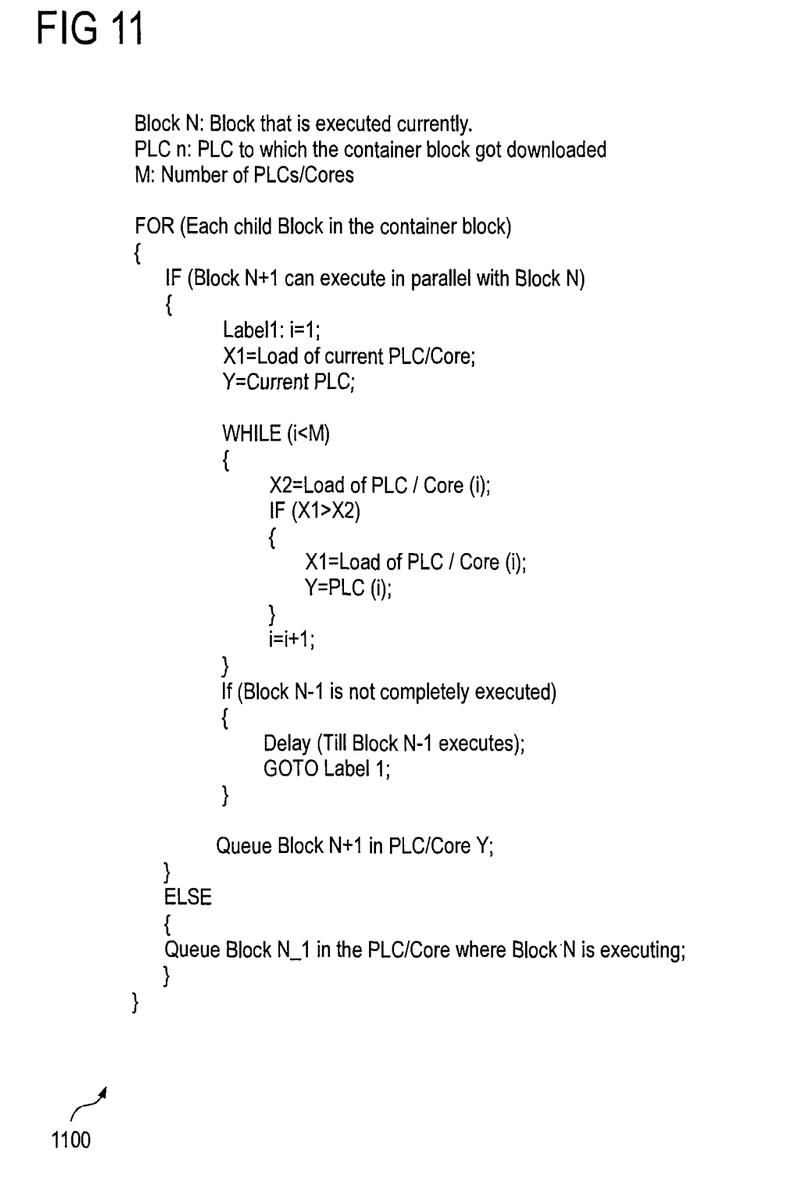
FIG. 11 illustrates a pseudo-code for scheduling unit blocks on multiple processors in accordance with an embodiment of the present invention.

Referring now to FIG. 11, pseudo-code 1100 for scheduling the unit blocks on multiple processors is shown. In accordance with the exemplary embodiment depicted in the adjoining figure, each successive unit block is queued for processing on one of a set of multiple processors based on a computational load on individual processors and complementary correspondence with one or more unit blocks under execution of the set of multiple processors.

Figure 12:
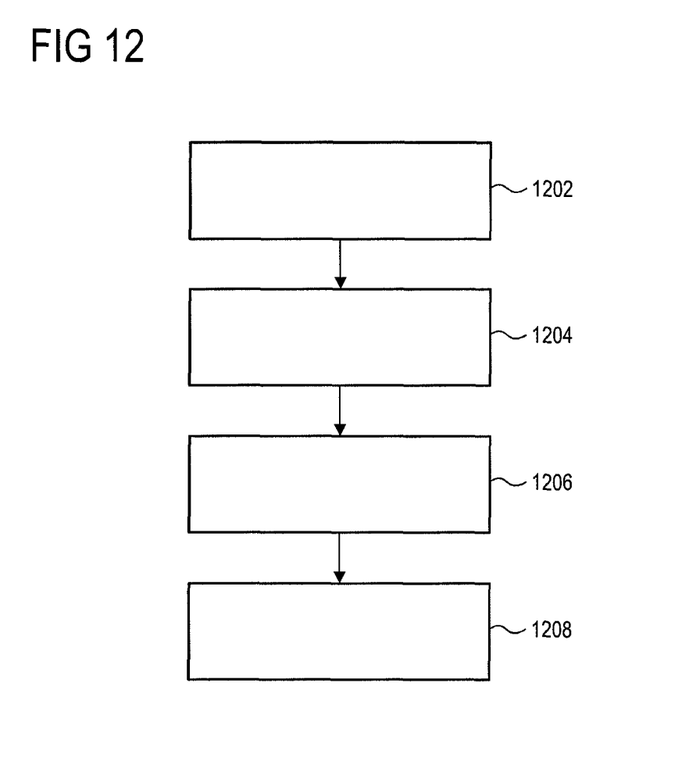
FIG. 12 illustrates a flowchart for a method for managing distributed computing suitable for implementation in an automation system in accordance with an embodiment of the present invention.

Referring now to FIG. 12, a method for managing distributed computing suitable for implementation in an automation system is shown.

At step 1202, a set of program instructions is partitioned into a plurality of unit blocks such that each unit block comprises at least one program instruction.

In an exemplary embodiment of the present invention, the set of program instructions is partitioned based on non-sequential processing instructions. A non-sequential beginning pointer initiates a partition and a non-sequential end pointer terminates the partition such that a sub-set of program instructions between the non-sequential beginning pointer and the non-sequential end pointer are grouped in an individual unit block.

In another exemplary embodiment of the present invention, the set of program instructions is partitioned such that each statement forms an individual unit block.

The above mentioned embodiments may be used in combination in a single implementation of the automation system.

At step 1204, one or more complementary blocks corresponding to at least one unit block are identified from the remainder of the plurality of unit blocks. The complementary blocks are identified based on a comparison between read-write access of global variables in the unit block and corresponding complementary blocks.

In an embodiment of the present invention, each complementary block corresponding to an individual unit block is such that none of the global variables read-accessed in the unit block is write-accessed in the complementary block.

At step 1206, each unit block is converted into binary format and associated with a container block such that the plurality of unit blocks forms a single logical entity.

In an embodiment of the present invention, during this step, the container block along with the plurality of unit blocks is transferred to one of the process controllers within the automation system.

At step 1208, the plurality of unit blocks are executed on a set of multiple processors within the automation system such that at least one complementary block is executed in parallel with a corresponding unit block.

In an embodiment of the present invention, each successive unit block is queued for processing on one of the set of multiple processors based on a computational load on individual processors and complemental correspondence with one or more unit blocks under execution of the set of multiple processors.

The present invention provides several advantages with regard to managing distributed computing within an automation system. The first and foremost advantage of the present invention is a faster execution time for each block in multi-core processor based process controllers or programmable logic controllers. At the same time, several industrial automation systems include more than one process controllers. In such cases, the present invention advantageously facilitates parallel execution of a control program on multiple process controllers, and thereby, leads to most optimum utilization of the combined computational capability of the automation system within the industrial plant.

The techniques disclosed in the present invention are very conducive to utilization of cloud computing for implementation of an automation system. This is possible because physically the container blocks may be resident on any individual process controller; however, any other process controller is able to access the same.

While the present invention has been described in detail with reference to certain embodiments, it should be appreciated that the present invention is not limited to those embodiments. In view of the present disclosure, many modifications and variations would present themselves, to those of skill in the art without departing from the scope of various embodiments of the present invention, as described herein. The scope of the present invention is, therefore, indicated by the following claims rather than by the foregoing description. All changes, modifications, and variations coming within the meaning and range of equivalency of the claims are to be considered within their scope.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for managing distributing computing suitable for use in an automation system, the method comprising:
    partitioning a set of program instructions into a plurality of unit blocks, each unit block comprising at least one program instruction;
    identifying at least one complementary block corresponding to at least one unit block from a remainder of said plurality of unit blocks, said at least one complementary block being identified based on a comparison between read-write access of global variables in said unit block comprising the at least one program instruction and the at least one corresponding complementary block, and said at least one complementary block from the remainder of said plurality of unit blocks being established such that none of said global variables read-accessed in said remainder of said plurality of unit blocks is write-accessed in said at least one complementary block; and
    executing the plurality of unit blocks on a set of multiple processors within the automation system, the at least one complementary block being executed in parallel with at least one corresponding unit block.

2. The method according to claim 1, wherein said set of program instructions is partitioned based on non-sequential processing instructions; and
    wherein a non-sequential beginning pointer initiates a partition and a non-sequential end pointer terminates said partition such that a sub-set of the program instructions between said non-sequential beginning pointer and said non-sequential end pointer are grouped in an individual unit block.

3. The method according to claim 1, wherein said set of program instructions is partitioned such that each statement forms an individual unit block.

4. The method according to claim 1 further comprising: converting each unit block of the plurality of unit blocks into a binary format and associating said unit block with a container block such that said plurality of unit blocks forms a single logical entity.

5. The method according to claim 1, wherein each successive unit block of the plurality of unit blocks is queued for processing on one of said set of multiple processors based on a computational load on individual processors and complementary correspondence with at least one unit block of the plurality of unit blocks being executed by said set of multiple processors.

6. A distributed computing management system in an automation system, said distributed computing management system comprising:
 a process controller;
 an engineering station;
 a partitioning module configured to partition a set of program instructions into a plurality of unit blocks, each unit block of the plurality of unit blocks comprising at least one program instruction;
 an assessment module configured to identify at least one complementary block corresponding to at least one unit block from a remainder of said plurality of unit blocks, said complementary blocks being identified based on a comparison between read-write access of global variables in said unit block of the plurality of unit blocks and corresponding complementary blocks, and said at least one complementary block from the remainder of said plurality of unit blocks being established such that none of said global variables read-accessed in said remainder of said plurality of unit blocks is write-accessed in said at least one complementary block; and
 a scheduling module configured to execute said plurality of unit blocks on a set of multiple processors within said automation system, at least one complementary block being executed in parallel with a corresponding unit block of the plurality of unit blocks.

7. The system according to claim 6, wherein said set of program instructions is partitioned based on non-sequential processing instructions; and
 wherein a non-sequential beginning pointer initiates a partition and a non-sequential end pointer terminates said partition such that a sub-set of program instructions between said non-sequential beginning pointer and said non-sequential end pointer are grouped in an individual unit block.

8. The system according to claim 6, wherein said set of program instructions is partitioned such that each statement forms an individual unit block.

9. The system according to claim 6, further comprising:
 a code-converter which converts each unit block of the plurality of unit blocks into binary format and associates said unit block with a container block such that said plurality of unit blocks forms a single logical entity.

10. The system according to claim 6, wherein each successive unit block is queued for processing on one processor of the set of multiple processors based on a computational load on individual processors and complementary correspondence with at least one unit block being executed by said set of multiple processors.

* * * * *